G. J. SAYER.
CONTROLLING DEVICE FOR SAUSAGE STUFFERS.
APPLICATION FILED OCT. 13, 1913.
1,091,538.
Patented Mar. 31, 1914.
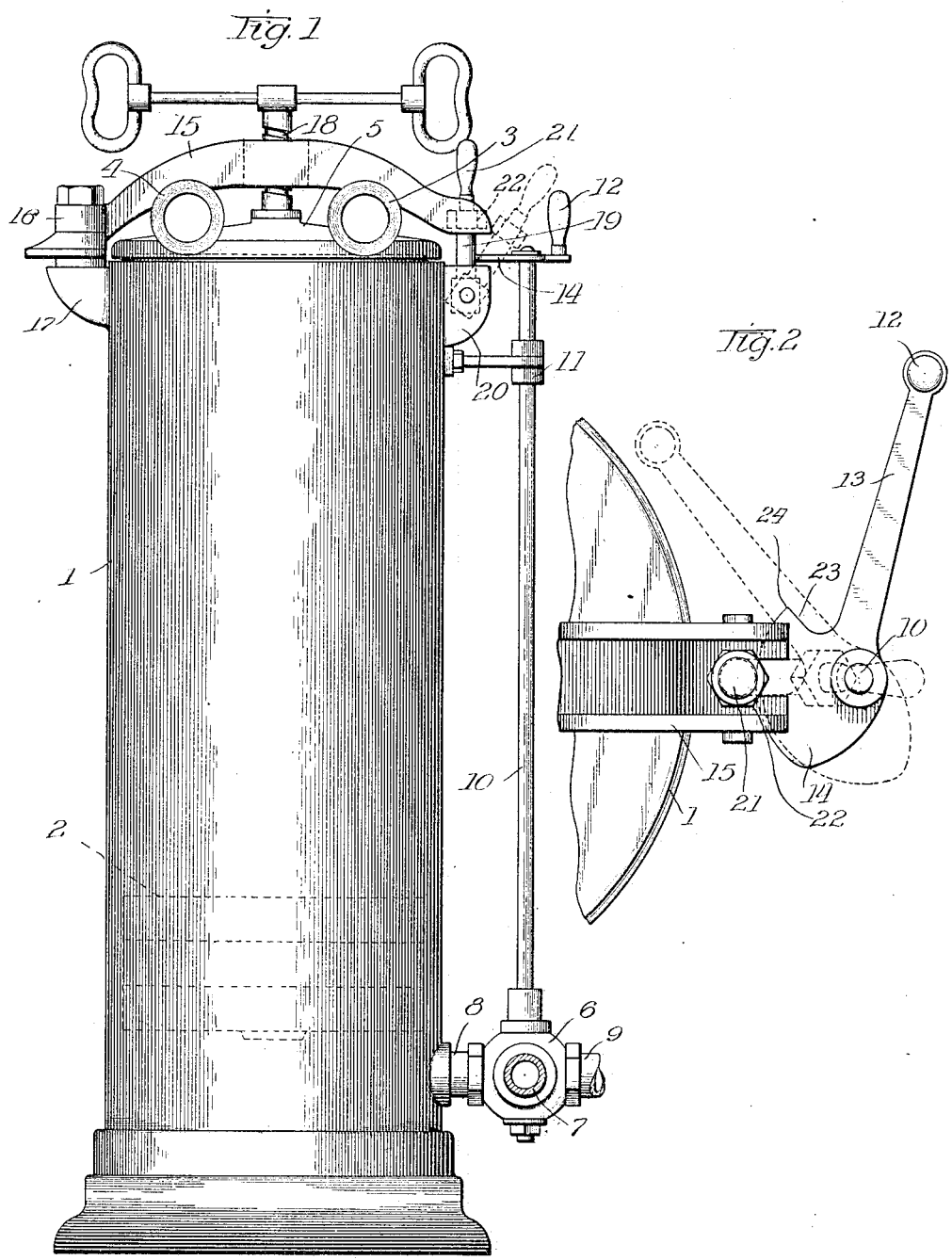
Witnesses:
Arthur W. Carlson
Hazel Ann Jones.
Inventor
George J. Sayer
by Max W. Zabel
Atty

UNITED STATES PATENT OFFICE.

GEORGE J. SAYER, OF CHICAGO, ILLINOIS.

CONTROLLING DEVICE FOR SAUSAGE-STUFFERS.

1,091,538.     Specification of Letters Patent.     Patented Mar. 31, 1914.

Application filed October 13, 1913. Serial No. 795,005.

*To all whom it may concern:*

Be it known that I, GEORGE J. SAYER, a citizen of the United States, residing at Chicago, in the county of Cook and State of Illinois, have invented a certain new and useful Improvement in Controlling Devices for Sausage-Stuffers, of which the following is a full, clear, concise, and exact description, reference being had to the accompanying drawings, forming a part of this specification.

My invention relates to controlling devices for sausage stuffers. In machines of this character a cylinder is used within which a piston reciprocates to force the sausage meat out through suitable orifices, the piston being controlled by the application of pressure supplied to the opposite side of the piston. Suitable valve mechanism is employed to control the application of pressure. A cover plate is provided for the cylinder preferably carrying the outlets or orifices through which the meat is forced and suitable mechanism is provided to permit of this cover being opened and to retain it in a closed position. It is quite dangerous to apply pressure to the pressure side of the piston should the cover plate not be tightly fastened, as this would very likely wreck the whole machine.

In my application Serial No. 741,178, filed Jan. 10, 1913, I set forth and claim broadly means for preventing the application of this pressure unless the cover is secured in position. In this present application I set forth what I believe are simplified means for accomplishing the same result.

In the form herein shown and also in the particular form of my invention disclosed in the aforesaid application, a three-way valve is utilized to control the application of the pressure. In the form of carrying out the invention as herein disclosed I combine the valve controlling mechanism with suitable interlocking mechanism adapted to coöperate with instrumentalities associated with the cover so that pressure cannot be supplied to the active side of the cylinder unless the cover is in the proper position to permit of the application of this pressure without damaging the machine.

I will explain one form of carrying out my invention by referring to the accompanying drawing illustrating the same, in which—

Figure 1 is a side view of a machine constructed in accordance with my invention, and Fig. 2 is a fragmentary detail view to more clearly illustrate the interlocking controlling mechanism.

My improved machine includes a cylinder 1 having a piston 2. This piston is adapted to force sausage meat through suitable openings or orifices provided in tubes 3 and 4. These tubes form part of the cover 5 which closes the cylinder 1. Pressure is supplied to the lower cylinder chamber through the agency of a three-way valve 6. This three-way valve may be so arranged, for instance, that a tube 7 leading from a source of pressure supply, not shown, conducts fluid under pressure to the cylinder when this tube is in communication with the inlet tube 8 leading to the cylinder. The valve, of course, effects this communication when desired. An exhaust tube 9 also may be provided so that when the tube 7 is closed and the source of pressure cut off that the superfluous pressure within the cylinder may exhaust through the tube 9. A valve spindle 10 suitably controls the valve. It will of course be readily apparent that any suitable pressure controlling means may be used in accordance with my invention other than that herein shown, if desired. The valve spindle is suitably guided by a bearing 11 and has at its upper extremity a handle 12. This handle is mounted in a suitable arm 13 as shown more clearly in Fig. 2. The valve spindle at its upper extremity is also provided with a cam 14. The cover 5 is mounted upon a bridge 15 which is pivotally supported at 16 upon a lug 17 projecting from the cylinder. This bridge by means of the screw threaded stud 18 supports the cover 5 and permits of a tight adjustment of this cover as the occasion may require after the bridge has been swung into the proper cover closing position. Of course, before the cover is then tightly forced against the cylinder it is necessary to hold and support the free extremity of the bridge and this I preferably do by providing a swinging bolt 19 pivotally mounted upon a projecting lug 20, which bolt is preferably supplied with a suitable handle 21 and an adjustable nut 22. This bolt is shown in Figs. 1 and 2 in one of its positions in full lines and in its alternative position by dotted lines. It will be readily seen from the illustration that when the bolt is swung into the closing position indicated by the figures that then it forms a support for the free extremity of the bridge so that the cover may then be forced downwardly.

When the bolt 19 is in the alternative position as shown in Fig. 1, then the cover 5 may be raised sufficiently to clear the piston by rotating the screw 18, and thereafter the bridge and cover may be swung around the pivot point at 16 so as to supply a fresh charge to the cylinder or for other purposes as may be desired. When the bolt is in the dotted position so that the cover may be opened, then this bolt rests against the curved portion 23 provided upon the inner face of the cam 14 and prevents rotation of the arm 13 in a clockwise direction. When the arm is in the position shown in dotted lines in Fig. 2, there is no pressure supplied to the piston, but on the contrary the cylinder communicates with the chamber through the tube 9.

It will be seen that it is impossible to turn on the pressure which would have to be done by rotating the arm 13 in a clockwise direction so long as this bolt 19 is in the dotted position. It will further be apparent that the cam surface at 23 is not so arranged as to automatically thrust the bolt 19 back into position, but a positive act on the part of the operator throwing the bolt back must take place before the cam can be released. Now when the machine has been placed in proper condition and the cover swung back into place, with the bridge in the proper place, then the bolt 19 may be swung into position to hold the bridge and after the bolt is entirely in its locking position then and then only can the arm 13 be rotated in a clockwise direction to supply pressure to the interior of the cylinder 1. I also preferably so arrange the cam 14 that a certain amount of movement of the arm 13 must take place after the edge 24 of the cam has passed the bolt before the pressure is supplied to the interior of the cylinder.

From what has been described it is thought the nature of my invention will be entirely clear to those skilled in the art, and it will also be apparent that my invention is susceptible of wide modifications without departing from its spirit.

Having however thus described one form which my invention may take, what I claim as new and desire to secure by Letters Patent is:

1. A device of the character described having a cylinder, a piston movable therein, a cover plate for said cylinder, cover controlling means, means to control the supply of pressure to said cylinder, and interlocking means interposed between said cover controlling means and said pressure controlling means, said interlocking means including a cam.

2. A device of the character described having a cylinder, a piston movable therein, a cover plate for said cylinder, cover controlling means, means to control the supply of pressure to said cylinder, and interlocking means interposed between said cover controlling means and said pressure controlling means, said interlocking means including a cam, said cover controlling means including a swinging lock bolt.

3. A device of the character described having a cylinder, a piston movable therein, a cover plate for said cylinder, cover controlling means, a valve to control the supply of pressure to said cylinder, and interlocking means interposed between said cover controlling means and said pressure controlling means, said interlocking means including a cam, said cover controlling means including a swinging lock bolt.

4. A device of the character described having a cylinder, a piston movable therein, a cover plate for said cylinder, cover controlling means, a valve to control the supply of pressure to said cylinder, a valve spindle for said valve, and interlocking means interposed between said cover controlling means and said pressure controlling means, said interlocking means including a cam, said cover controlling means including a swinging lock bolt, said cam being carried by said valve spindle.

5. A device of the character described having a cylinder, a piston movable therein, a cover plate for said cylinder, cover controlling means, a valve to control the supply of pressure to said cylinder, a valve spindle for said valve, and interlocking means interposed between said cover controlling means and said pressure controlling means, said interlocking means including a cam, said cover controlling means including a swinging lock bolt, said cam being carried by said valve spindle, said bolt when not in its cover locking position preventing the operative movement of said cam.

6. A device of the character described having a cylinder, a piston movable therein, a cover plate for said cylinder, cover controlling means, a valve to control the supply of pressure to said cylinder, a valve spindle for said valve, and interlocking means interposed between said cover controlling means and said pressure controlling means, said interlocking means including a cam, said cover controlling means including a swinging lock bolt, said cam being carried by said valve spindle, said bolt when not in its cover locking position preventing the operative movement of said cam, and said bolt when in its cover locking position being removed from the path of said cam to permit movement of said cam.

7. A device of the character described having a cylinder, a piston movable therein, a cover plate for said cylinder, cover controlling means, a valve to control the supply of pressure to said cylinder, a valve spindle for said valve, and interlocking means interposed between said cover controlling means and said pressure controlling means, said interlocking means including a cam, said cover controlling means including a swinging lock bolt, said cam being carried by said valve spindle, said bolt when not in its cover locking position preventing the operative movement of said cam, and a handle for said bolt.

8. A device of the character described having a cylinder, a piston movable therein, a cover plate for said cylinder, cover controlling means, a valve to control the supply of pressure to said cylinder, a valve spindle for said valve, and interlocking means interposed between said cover controlling means and said pressure controlling means, said interlocking means including a cam, said cover controlling means including a swinging lock bolt, said cam being carried by said valve spindle, said bolt when not in its cover locking position preventing the operative movement of said cam, and said bolt when in its cover locking position being removed from the path of said cam to permit movement of said cam, and a handle for said bolt.

In witness whereof, I hereunto subscribe my name this twenty fifth day of September A. D., 1913.

GEORGE J. SAYER.

Witnesses:
WM. S. CHAPIN,
GUSTAV REICHARDS.

Copies of this patent may be obtained for five cents each, by addressing the "Commissioner of Patents, Washington, D. C."